US012571682B2

(12) United States Patent
Hamada

(10) Patent No.: US 12,571,682 B2
(45) Date of Patent: Mar. 10, 2026

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Tetsuya Hamada, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 144 days.

(21) Appl. No.: 18/627,519

(22) Filed: Apr. 5, 2024

(65) Prior Publication Data

US 2024/0344887 A1 Oct. 17, 2024

(30) Foreign Application Priority Data

Apr. 11, 2023 (JP) ................................. 2023-064389

(51) Int. Cl.
*G01J 3/46* (2006.01)
*B41J 2/21* (2006.01)

(52) U.S. Cl.
CPC ............. *G01J 3/462* (2013.01); *B41J 2/2117* (2013.01)

(58) Field of Classification Search
CPC .... G01J 3/462; G01J 3/463; B41J 2/21; B41J 2/2117
See application file for complete search history.

(56) References Cited

U.S. PATENT DOCUMENTS

2018/0364954 A1* 12/2018 Tsuji ..................... G06F 3/1204

FOREIGN PATENT DOCUMENTS

JP 2021-133601 A 9/2021

OTHER PUBLICATIONS

Tetsuya Hamada, U.S. Appl. No. 18/669,777, filed May 21, 2024.

* cited by examiner

*Primary Examiner* — Kevin K Pyo
(74) *Attorney, Agent, or Firm* — VENABLE LLP

(57) ABSTRACT

In an information processing apparatus, a first obtaining unit obtains, in a case where a setting for executing a base coating process for a print medium before printing on the print medium is made, a first color profile independent of a type of a print medium, and obtains, in a case where the setting for executing the base coating process is not made, a second color profile corresponding to a type of the print medium. An output unit outputs the first color profile for the print medium having undergone the base coating process, and outputs the second color profile for the print medium not having undergone the base coating process.

11 Claims, 13 Drawing Sheets

Figure 5:
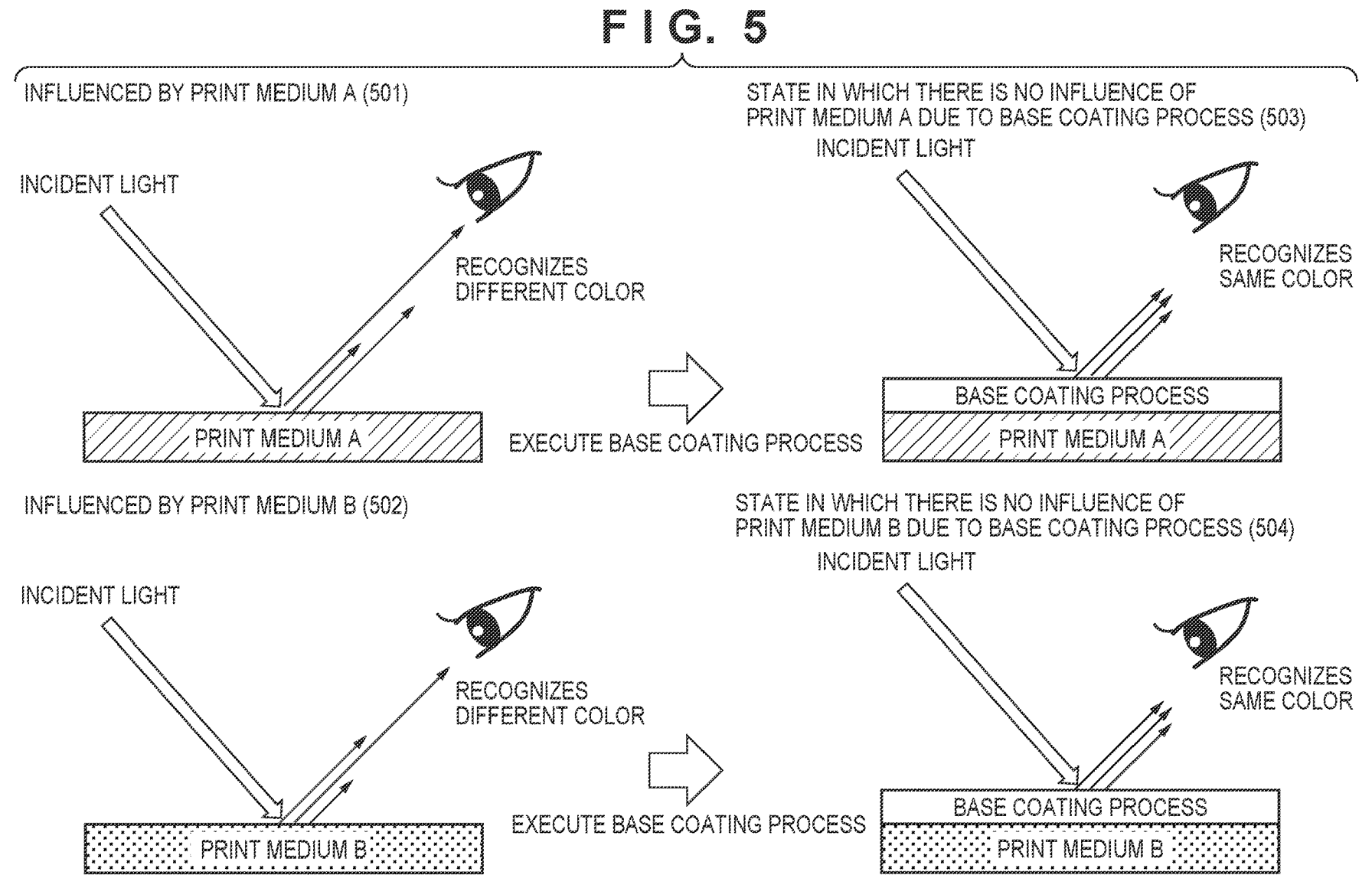

INFLUENCED BY PRINT MEDIUM A (501)

INCIDENT LIGHT

RECOGNIZES DIFFERENT COLOR

PRINT MEDIUM A

EXECUTE BASE COATING PROCESS

STATE IN WHICH THERE IS NO INFLUENCE OF PRINT MEDIUM A DUE TO BASE COATING PROCESS (503)

INCIDENT LIGHT

RECOGNIZES SAME COLOR

BASE COATING PROCESS

PRINT MEDIUM A

INFLUENCED BY PRINT MEDIUM B (502)

INCIDENT LIGHT

RECOGNIZES DIFFERENT COLOR

PRINT MEDIUM B

EXECUTE BASE COATING PROCESS

STATE IN WHICH THERE IS NO INFLUENCE OF PRINT MEDIUM B DUE TO BASE COATING PROCESS (504)

INCIDENT LIGHT

RECOGNIZES SAME COLOR

BASE COATING PROCESS

PRINT MEDIUM B

F I G. 6
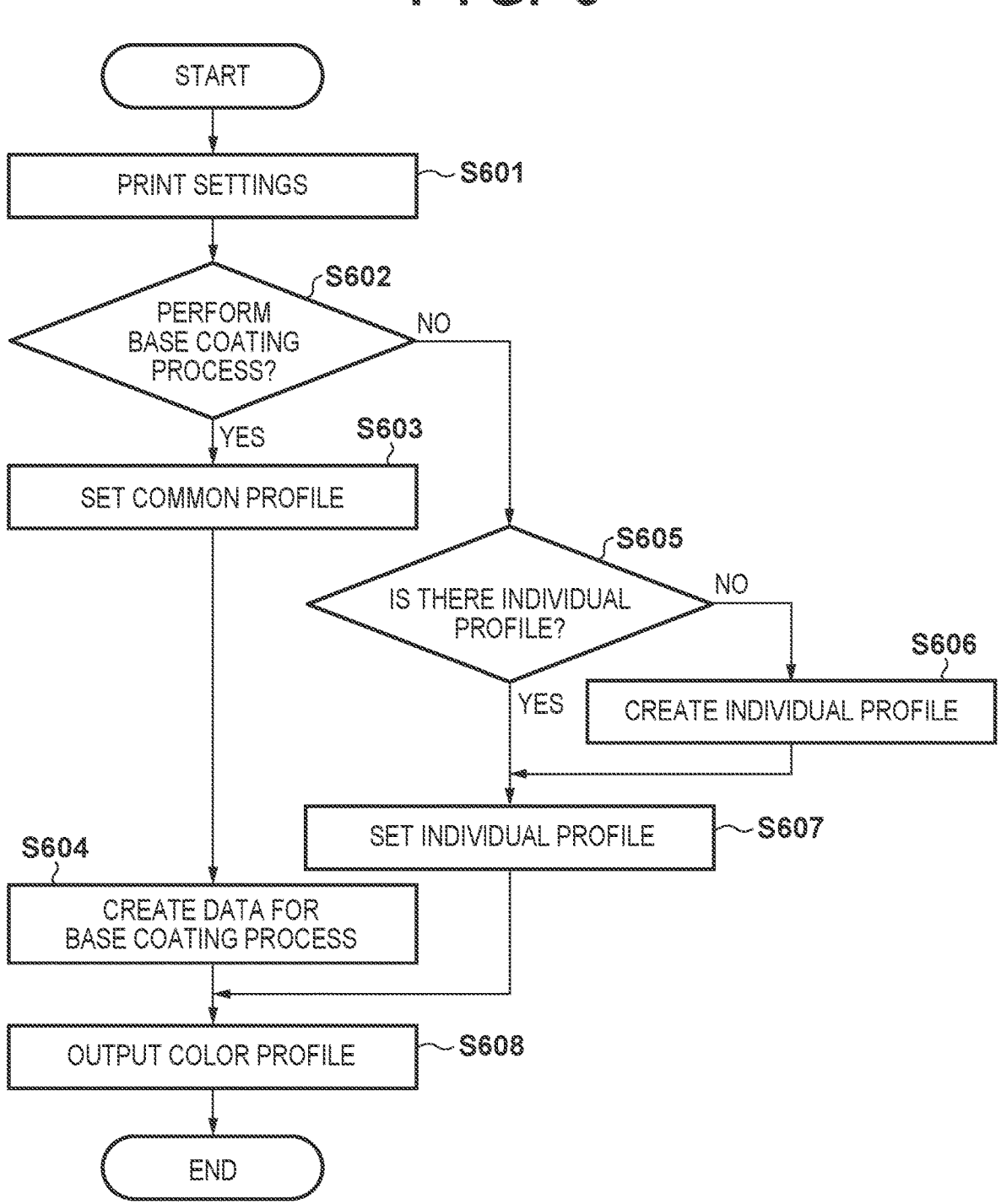

FIG. 7

COLOR PRINT DATA

WHITE BASE OF COLOR DATA

701

702

Wine

COLOR PATCH

703

WHITE BASE OF COLOR PATCH

704

705 or

F I G. 8
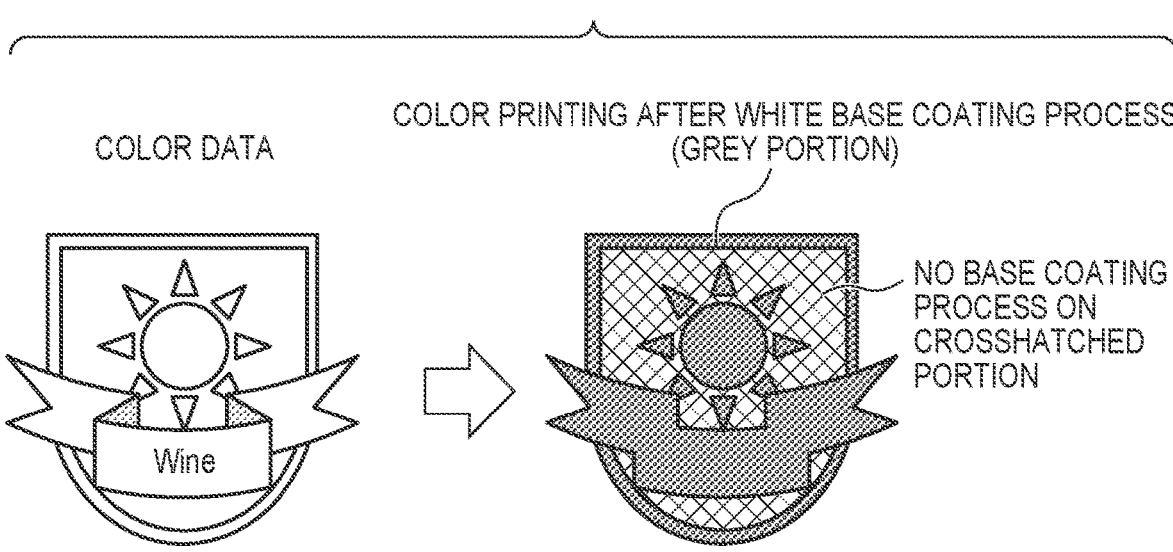
COLOR DATA
COLOR PRINTING AFTER WHITE BASE COATING PROCESS
(GREY PORTION)
NO BASE COATING
PROCESS ON
CROSSHATCHED
PORTION

F I G.  10

| PRINT MEDIUM | PRINT MEDIUM COLOR | POSSIBLE/IMPOSSIBLE TO CREATE INDIVIDUAL PROFILE WITHOUT BASE | PROFILE WITH BASE COATING PROCESS | PROFILE WITHOUT BASE COATING PROCESS |
|---|---|---|---|---|
| MEDIUM A | OTHER THAN WHITE | NOT POSSIBLE | COMMON PROFILE | NONE |
| MEDIUM B | COLOR CLOSE TO WHITE | POSSIBLE | COMMON PROFILE | INDIVIDUAL PROFILE |
| MEDIUM C | WHITE | POSSIBLE | COMMON PROFILE | INDIVIDUAL PROFILE |

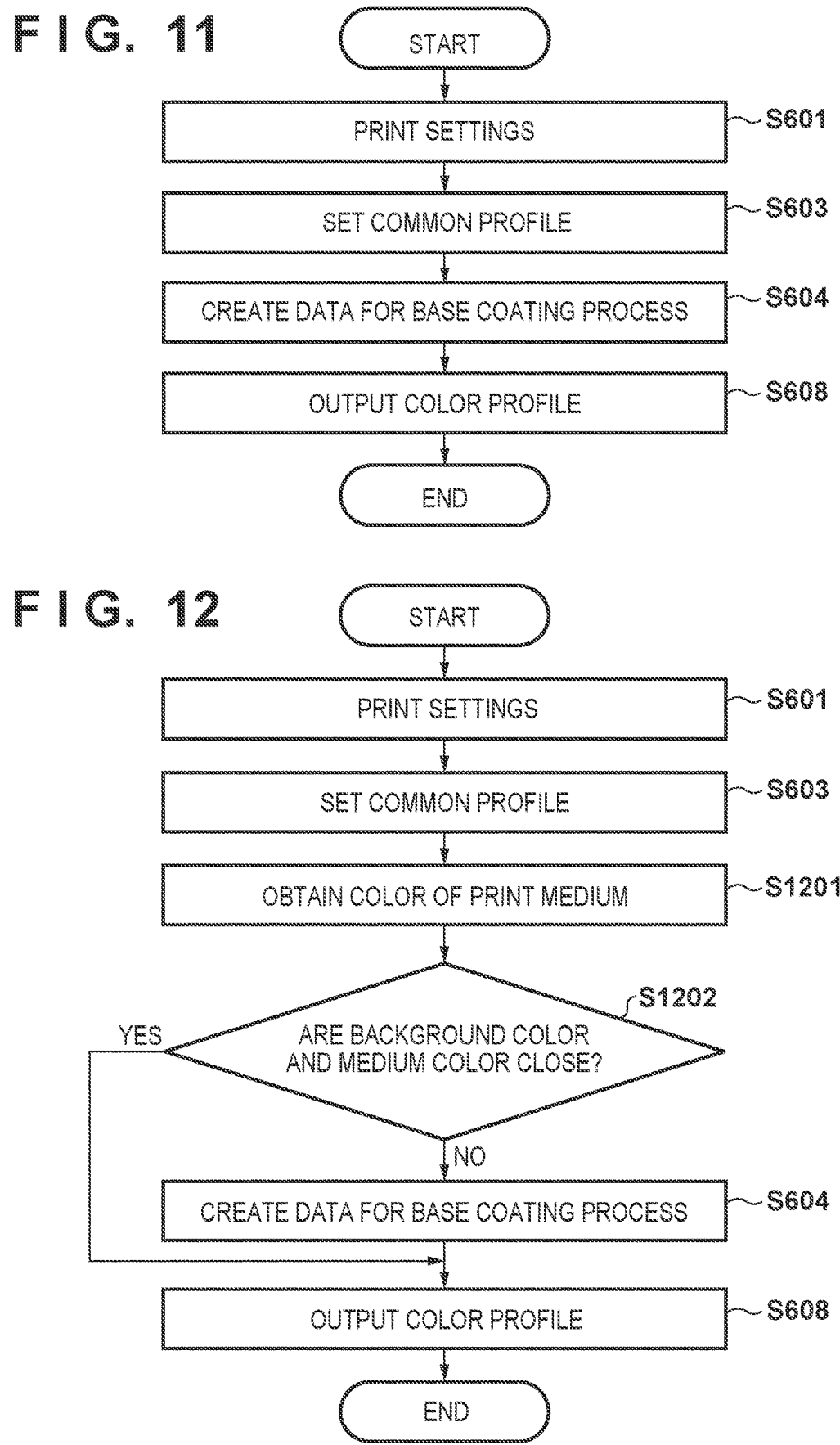
F I G. 11
START
PRINT SETTINGS — S601
SET COMMON PROFILE — S603
CREATE DATA FOR BASE COATING PROCESS — S604
OUTPUT COLOR PROFILE — S608
END
F I G. 12
START
PRINT SETTINGS — S601
SET COMMON PROFILE — S603
OBTAIN COLOR OF PRINT MEDIUM — S1201
ARE BACKGROUND COLOR AND MEDIUM COLOR CLOSE? — S1202
YES
NO
CREATE DATA FOR BASE COATING PROCESS — S604
OUTPUT COLOR PROFILE — S608
END

F I G. 13
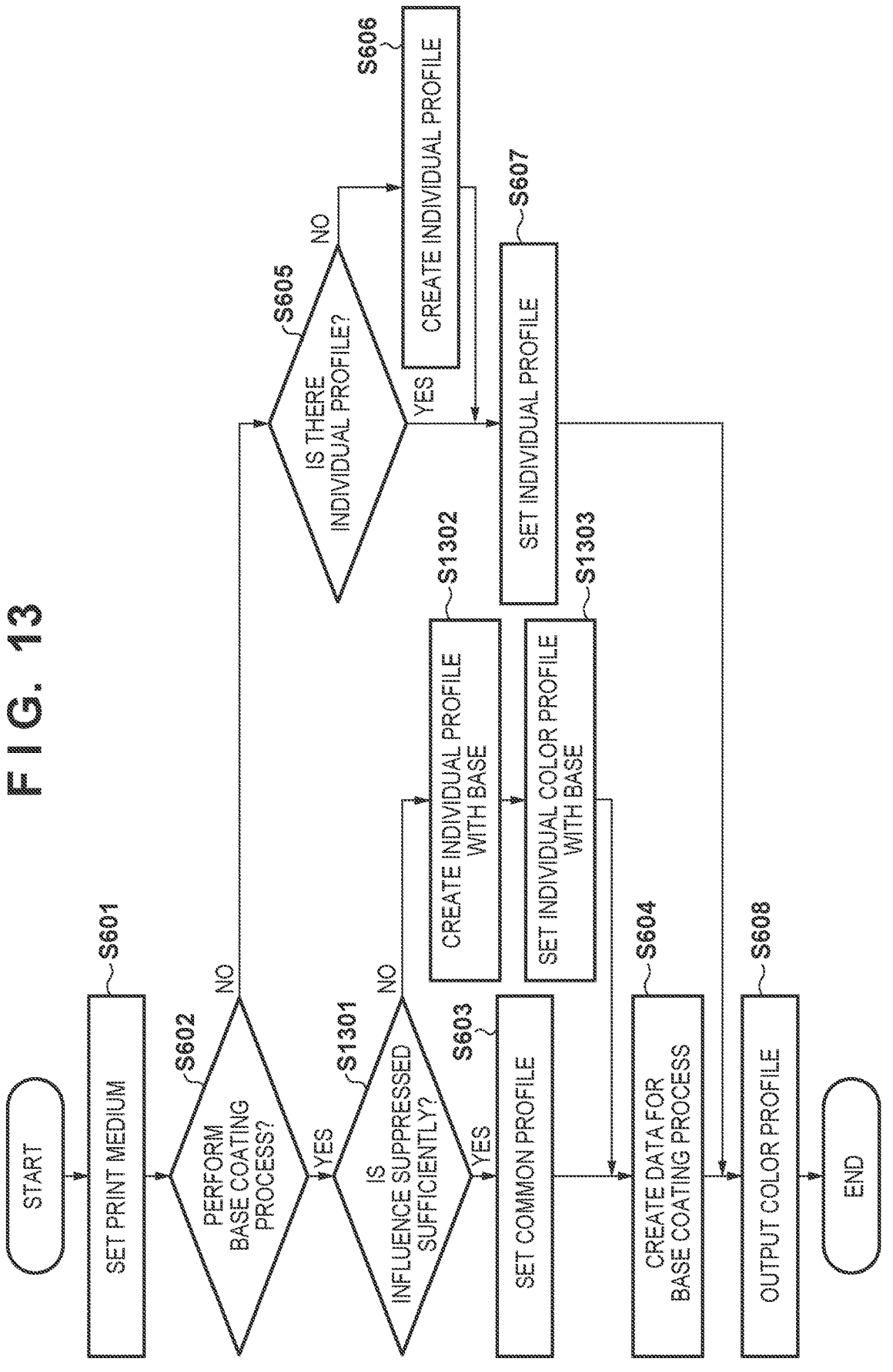

F I G. 16
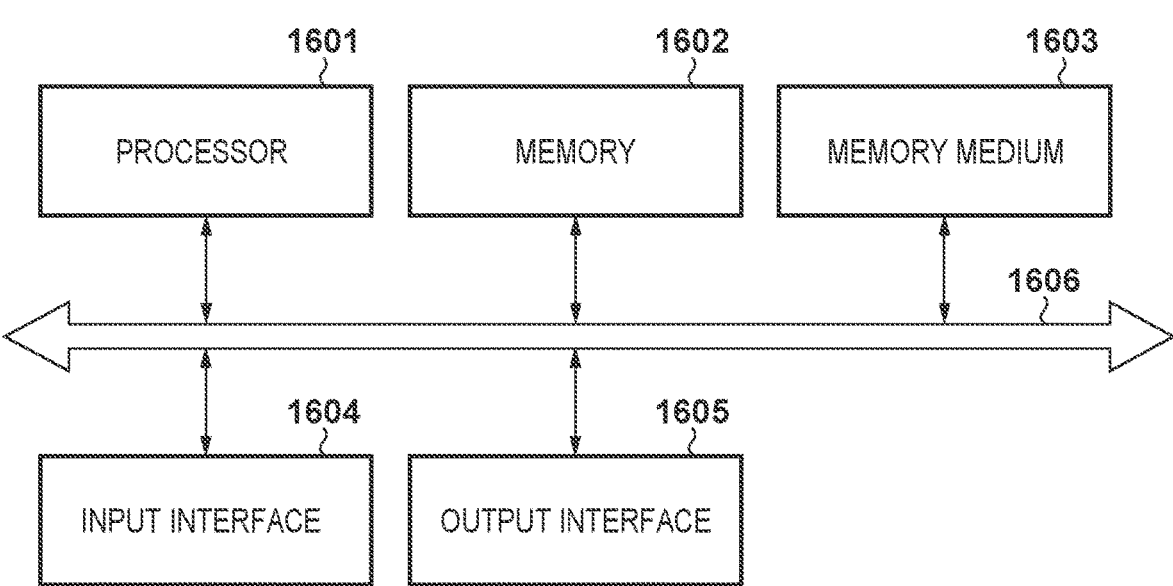

INFORMATION PROCESSING APPARATUS, INFORMATION PROCESSING METHOD, AND STORAGE MEDIUM

BACKGROUND OF THE INVENTION

Field of the Invention

The present invention relates to an information processing apparatus, an information processing method, and a storage medium.

Description of the Related Art

There is a print medium, called a sticker or label, having a multilayer structure formed by backing paper and a sheet attached to the backing paper. For this print medium, a material with weatherability and a color drawing attention is often used for the use application of the print medium. There are many print media using various colors or materials such as materials colored with gold, silver, and other colors or materials such as paper and films.

There is a technique called color matching as a mechanism of printing on a print medium with correct tint by a printing apparatus. In the color matching process, a color conversion process is performed so as to print on each print medium with a correct color using a color profile that associates, with the print medium, a color development characteristic when executing printing by the printing apparatus. To print with correct tint by the color matching process, it is necessary to create, in advance, a color profile for each print medium.

In the case of a sticker or label, the color of the backing paper may be seen through a sheet. If a color patch for creating a color profile is printed on such print medium, and colorimetry is performed in a state in which the sheet is attached to the backing paper, a colorimetric value is influenced by the color of the backing paper to make it impossible to obtain correct colorimetric data, and thus it is difficult to create a correct color profile. Japanese Patent Laid-Open No. 2021-133601 discloses a technique for performing a base coating process of executing base printing by white ink before printing a color patch so a colorimetry result is not influenced by the color of backing paper.

SUMMARY OF THE INVENTION

According to one embodiment of the present invention, an information processing apparatus comprises a first obtaining unit configured to obtain, in a case where a setting for executing a base coating process for a print medium before printing on the print medium is made, a first color profile independent of a type of a print medium, and obtain, in a case where the setting for executing the base coating process is not made, a second color profile corresponding to a type of the print medium; and an output unit configured to output the first color profile for the print medium having undergone the base coating process, and output the second color profile for the print medium not having undergone the base coating process.

According to another embodiment of the present invention, an information processing method comprises: obtaining, in a case where a setting for executing a base coating process for a print medium before printing on the print medium is made, a first color profile independent of a type of a print medium, and obtain, in a case where the setting for executing the base coating process is not made, a second color profile corresponding to a type of the print medium; and outputting the first color profile for the print medium having undergone the base coating process, and output the second color profile for the print medium not having undergone the base coating process.

According to yet another embodiment of the present invention, a non-transitory computer readable storage medium on which is stored a computer program for making a computer execute an information processing method comprises: obtaining, in a case where a setting for executing a base coating process for a print medium before printing on the print medium is made, a first color profile independent of a type of a print medium, and obtain, in a case where the setting for executing the base coating process is not made, a second color profile corresponding to a type of the print medium; and outputting the first color profile for the print medium having undergone the base coating process, and output the second color profile for the print medium not having undergone the base coating process.

Further features of the present invention will become apparent from the following description of exemplary embodiments (with reference to the attached drawings).

BRIEF DESCRIPTION OF THE DRAWINGS

FIG. 1 is a view showing an example of the arrangement of an image forming apparatus according to the first embodiment;

FIG. 5 is a view showing examples of a print medium and the appearance by a base coating process according to the first embodiment;

FIG. 6 is a flowchart illustrating an example of a process executed by an information processing apparatus according to the first embodiment;

FIG. 7 is a view for explaining generation of data for the base coating process according to the first embodiment;

FIG. 8 is a view for explaining printing using the base coating process according to the first embodiment;

FIG. 10 is a table showing the relationship between the base coating process and a color profile according to the first embodiment;

FIG. 11 is a flowchart illustrating an example of a process executed by an information processing apparatus according to the second embodiment;

FIG. 12 is a flowchart illustrating an example of a process executed by an information processing apparatus according to the third embodiment;

FIG. 13 is a flowchart illustrating an example of a process executed by an information processing apparatus according to the fourth embodiment;

FIG. 16 is a block diagram showing an example of the hardware arrangement of an information processing apparatus.

DESCRIPTION OF THE EMBODIMENTS

Figure 2:
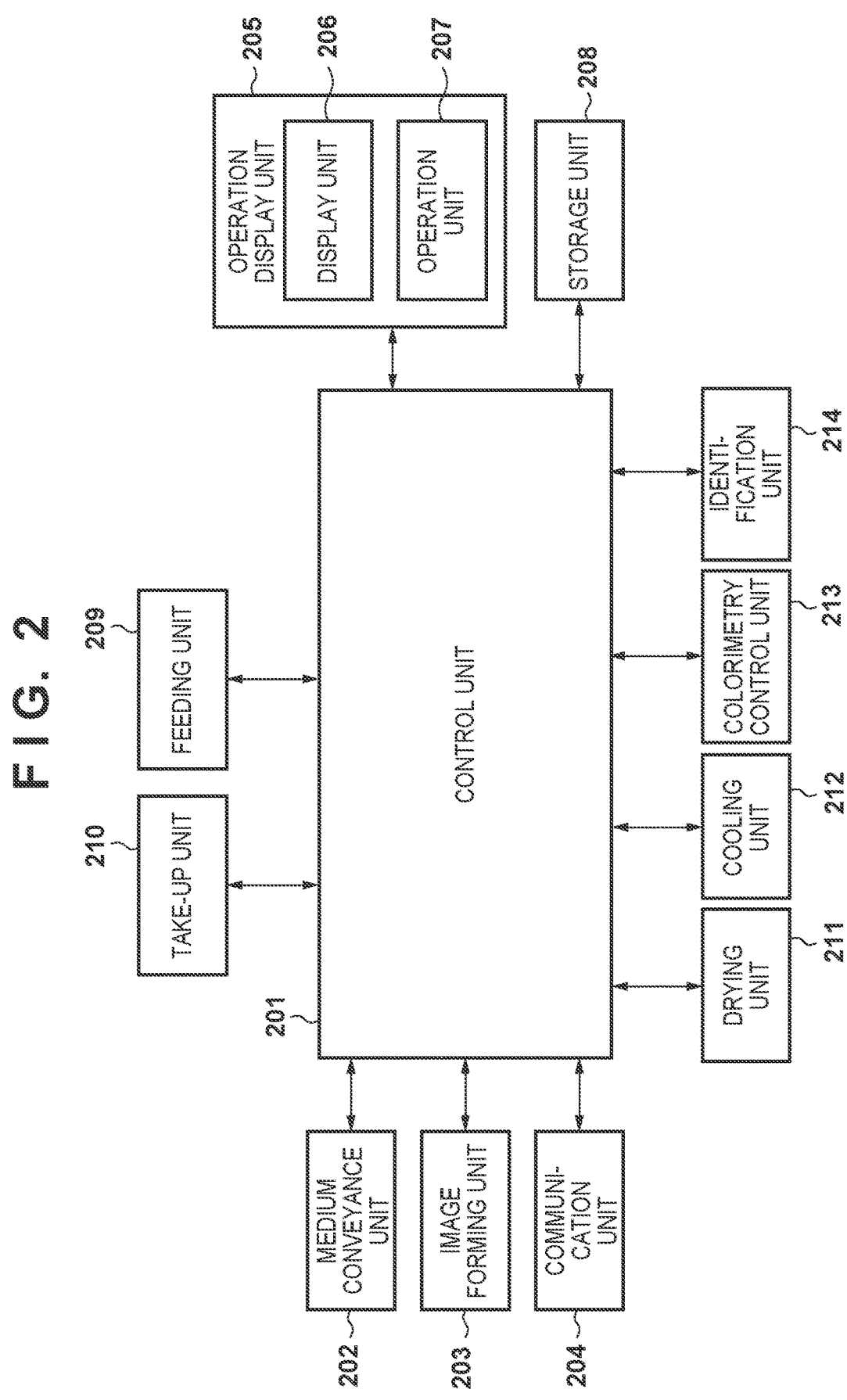
FIG. 2 is a block diagram showing an example of the functional arrangement of the image forming apparatus according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Since a color development characteristic in printing is different depending on a print medium to be printed, it is necessary to create a color profile for each print medium, and it requires much cost to create a color profile.

Embodiments of the present invention provide an information processing apparatus that reduces cost for creating a color profile.

First Embodiment

Since a color development characteristic in printing is different depending on a print medium to be printed, it is necessary to create a color profile for each print medium. A color profile is created by printing many color patches obtained by combining various colors, sufficiently drying a printed product, performing colorimetry of the color patches by a colorimeter, and executing a calculation process using colorimetric data. Therefore, this requires much time and labor. To create a color profile for each of all print media to be used, much labor, cost, and time are required. In addition, to manage and operate many created color profiles, knowledge and experience of color profiles and color matching are required.

An information processing apparatus according to this embodiment determines whether a setting for executing a base coating process for a print medium before printing on the print medium is made. If the setting for executing the base coating process is made, the information processing apparatus obtains a color profile independent of the type of the print medium. Next, the information processing apparatus selects and outputs the obtained color profile as a color profile to be used for color matching in printing on the print medium determined to undergo the base coating process. By selecting a color profile independent of the type of the print medium when executing the base coating process, it is possible to operate a common color profile. Therefore, it is possible to reduce the cost, labor, and time that are required to create a color profile for each print medium. Furthermore, by eliminating the necessity of using a color profile for each print medium, even a user that has no special knowledge or experience can operate and set the image forming apparatus.

Figure 1:
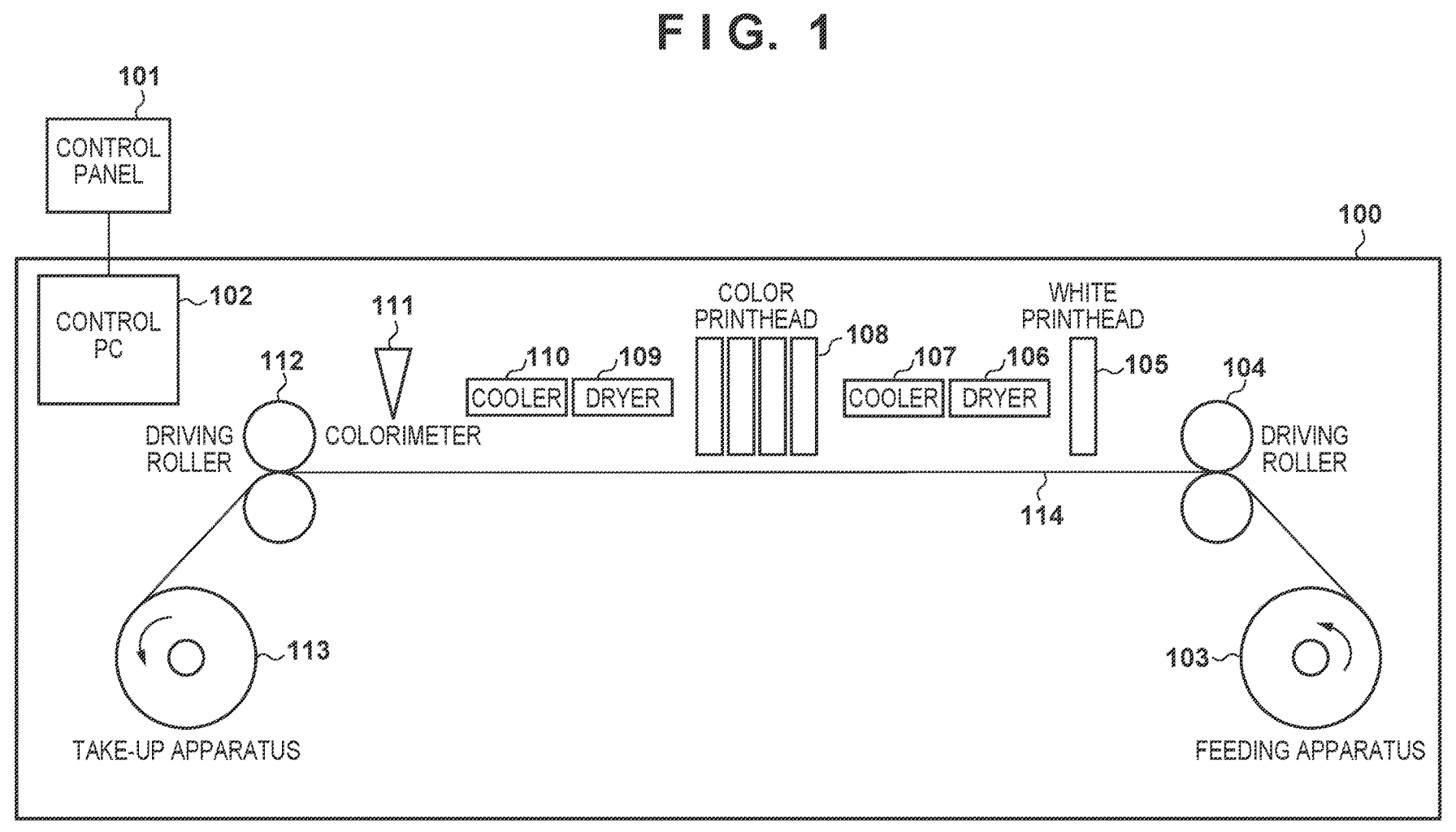

The arrangement of an image forming apparatus according to this embodiment will be described below with reference to FIG. 1. FIG. 1 shows an example of the schematic arrangement of the image forming apparatus according to the embodiment. An image forming apparatus 100 is a printing apparatus that forms (prints) an image on a print medium, and is controlled by operating an information processing apparatus 102 via a control panel 101. The information processing apparatus 102 is an apparatus that controls the operation of the image forming apparatus 100, and is a personal computer (PC) in this example. However, the information processing apparatus 102 is not particularly limited, and any apparatus that can control the image forming apparatus 100, such as a portable terminal including a smartphone or a server, can be used. The control panel 101 is a touch panel in this example but is not particularly limited, and any device that inputs data to the information processing apparatus 102 can be used. For example, another input device such as a keyboard and a mouse may be used.

A feeding apparatus 103 is attached with an unprinted print medium 114 wound into a roll. The print medium 114 is conveyed in a conveyance direction by driving rollers 104. The image forming apparatus 100 according to this embodiment performs the base coating process for the print medium 114 by a white printhead 105. Assume here that the white printhead 105 performs the base coating process by fixing white ink on the print medium 114 using white ink and fixing ink for fixing white ink on the print medium 114. However, the base coating process is not limited to a process of printing white ink on the print medium and can include various kinds of processes according to requirements. For example, the base coating process may fix, on the print medium 114, ink of a color (for example, gray or blue) different from white instead of white ink, and may be a different process of, for example, applying ink for suppressing glossiness.

In this example, since the base coating process is performed before printing by color inks, white ink is printed before executing color printing. A dryer 106 dries printing by white ink by heat or air. A cooler 107 cools the print medium 114 heated by the dryer 106, thereby preventing the print medium 114 from being deformed or degraded by heat. A color printhead 108 executes printing (color printing) on the print medium 114 by color inks. The types of the color inks used by the color printhead 108 may be a combination (CMYK) of cyan (C), magenta (M), yellow (Y), and black (K) or a combination of other color inks, or each ink may individually be used. As inks of colors other than the four colors of CMYK, inks of colors such as green (G), orange (O), and violet (V) may be used, or fixing ink for fixing ink on the print medium or the like may be used.

Color printing according to this embodiment may be executed on the print medium 114 having undergone the base coating process, or may directly be executed on the print medium 114 without performing the base coating process by white ink. After the color printhead 108 executes color printing, a dryer 109 dries color printing by heat or air. A cooler 110 cools the print medium 114 heated by the dryer 109. When executing color profile creation, calibration, color adjustment, or the like, a colorimeter 111 measures a printed chart to obtain colorimetric data. The obtained colorimetric data is used to perform a colorimetric process such as color profile creation, calculation of a calibration correction value, or calculation of a color adjustment value using the information processing apparatus 102 or a computer connected to a network (not shown). The print medium 114 is conveyed by driving rollers 112, and a printed product is taken up by a take-up apparatus 113.

FIG. 2 is a block diagram showing an example of the arrangement of the image forming apparatus 100. A control unit 201 is formed by a Central Processing Unit (CPU), a Random Access Memory (RAM), and the like. The CPU of the control unit 201 reads out various programs such a system program and a processing program stored in a storage unit 208, and deploys them on the RAM. The control unit 201 can execute various kinds of processes in accordance with the deployed programs, and can perform an image forming process in accordance with a user instruction.

A medium conveyance unit 202 conveys the print medium attached to the image forming apparatus and wound into a roll. The image forming apparatus 100 according to this embodiment conveys, to an image forming unit 203, by a plurality of conveyance rollers, the print medium conveyed from a feeding unit 209, executes printing, and dries the printed print medium by a drying unit 211. The print medium heated by the drying unit is cooled by a cooling unit 212, and then conveyed to a take-up unit 210 to be taken up. Based on print data for which a print instruction is received via a communication unit 204, the image forming unit 203 forms an image to be printed on the print medium supplied from the feeding unit 209.

The communication unit 204 transmits/receives various kinds of data to/from an external apparatus (for example, a personal computer) connected to a communication network such as a LAN or a Wide Area Network (WAN). The communication unit 204 may be formed by, for example, a communication control device such as a Local Area Network (LAN) card.

An operation display unit 205 is formed by, for example, a Liquid Crystal Display (LCD) with a touch panel, and includes a display unit 206 and an operation unit 207. The display unit 206 displays various kinds of information on a display screen in accordance with display control signal input from the control unit 201. The operation unit 207 includes various input devices such as a keyboard and a mouse, and accepts various input operations by the user to output operation signals to the control unit 201. The operation display unit 205 according to this embodiment is, for example, a liquid crystal display with a touch panel, and is one device including both the display unit 206 and the operation unit 207. However, the display unit 206 and the operation unit 207 may be implemented as separate devices.

The storage unit 208 is formed by a volatile semiconductor memory (so-called flash memory), a Hard Disk Drive (HDD), or the like, and stores various kinds of information. The storage unit 208 stores various programs including a system program and a processing program to be executed by the control unit 201, and various kinds of data necessary to execute these programs.

The feeding unit 209 supplies the print medium (for example, the print medium wound into a roll) to be printed by the image forming unit 203. The take-up unit 210 takes up, in a roll, the print medium having undergone various kinds of print processes. By taking up the print medium in a roll, it is possible to facilitate management and delivery of a printed product. Note that the print process according to this embodiment includes the image forming process by the image forming unit 203, the dry process by the drying unit 211, and the cooling process by the cooling unit 212. However, not all the processes need to be performed, and another known process concerning printing may further be included.

The drying unit 211 performs a dry process of drying the print medium. The drying unit 211 can perform a dry process by, for example, a dryer that blows out hot air or a heater including a heating element that becomes a high temperature. If the print medium is taken up in a roll before ink in a portion printed by the image forming unit 203 is dried, the undried ink is transferred to the print medium, and thus the print medium needs to be sufficiently dried. If the setting temperature used for drying is too high, the print medium may be deformed, and if the setting temperature is too low, the print surface is not sufficiently dried. Therefore, the drying unit 211 can control the temperature and amount of air to be blown to the print medium by the dryer in accordance with the characteristic of the print medium.

The cooling unit 212 cools, by sending air, the print medium heated by the drying unit 211 for drying. This cooling process can stabilize the print surface, and prevent excessive deformation of the print medium.

A colorimetric control unit 213 performs colorimetry and color evaluation of the print medium for color profile creation, calibration, color adjustment, or the like. For example, the colorimetric control unit 213 can measure a colorimetric chart (obtained by filling each of many rectangles with a color, arranging them in a tile pattern, and executing printing) printed by the image forming unit 203, thereby obtaining spectral data or density data of the printed color.

An identification unit 214 specifies the type of the print medium set in the printer. The identification unit 214 includes, for example, a sensor (not shown) that measures the characteristic of the print medium, and can specify the type of the print medium based on a feature amount obtained from the sensor when the print medium is set in the image forming apparatus 100. The identification unit 214 may cause the display unit 206 to display the specified print medium and the like as candidates, and specify the type of the print medium based on the input led by the user.

Figure 14:
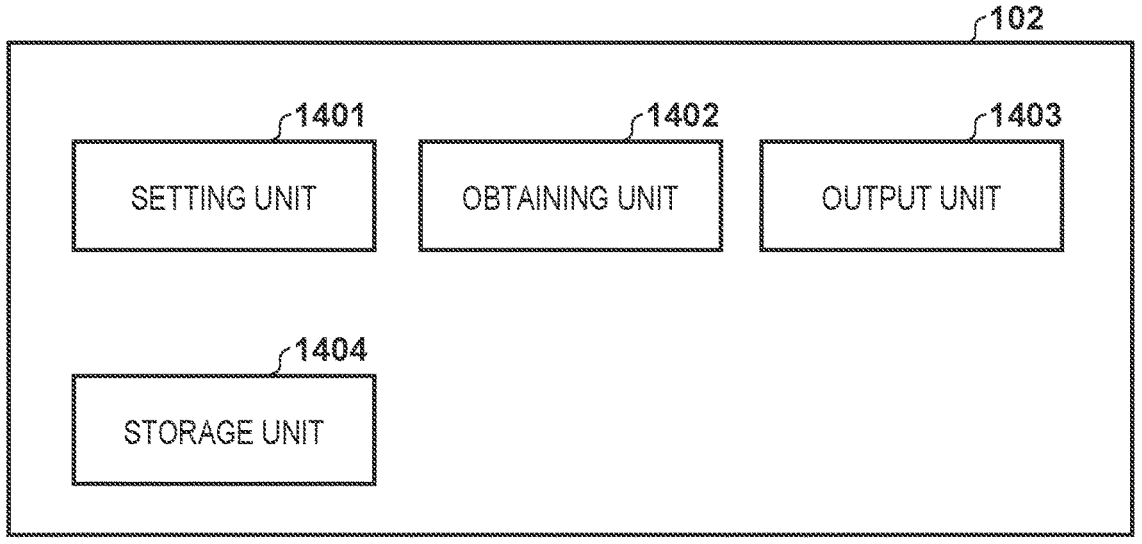
FIG. 14 is a block diagram showing an example of the functional arrangement of the information processing apparatus according to the first embodiment.

FIG. 14 is a block diagram showing an example of the functional arrangement of the information processing apparatus 102 according to this embodiment. The information processing apparatus 102 includes a setting unit 1401, an obtaining unit 1402, an output unit 1403, and a storage unit 1404.

The setting unit 1401 sets whether to execute the base coating process before printing on the print medium. The setting unit 1401 can set, in accordance with, for example, a user operation, whether to execute the base coating process. For example, the setting unit 1401 can set, based on the print medium to undergo the base coating process, whether to execute the base coating process. In this case, for example, if the type of the print medium is a predetermined type, the setting unit 1401 may set to execute the base coating process. If, for example, the information processing apparatus 102 is included in the image forming apparatus 100, whether to execute the base coating process may be set based on the colorimetry result of the print medium set in the image forming apparatus 100. A process of setting, based on the colorimetry result, whether to execute the base coating process will be described later with reference to FIG. 10.

The obtaining unit 1402 sets a color profile to be used in printing. The obtaining unit 1402 according to this embodiment refers to the setting of whether to execute the base coating process, and obtains, if the setting for executing the base coating process is made, a color profile (common profile) independent of the type of the print medium. In this embodiment, the common profile is a color profile that is selected regardless of the type of the print medium to be printed, and a color profile that assumes the base coating process using white ink is used.

The output unit 1403 outputs the color profile obtained by the obtaining unit 1402 to be used for color matching for the print medium having undergone the base coating process. In this example, the output unit 1403 outputs the color profile obtained by the obtaining unit 1402 to the image forming apparatus 100, and sends an instruction to perform color matching using the output color profile.

The storage unit 1404 stores information of the common profile. The common profile according to this embodiment is preset and stored in the storage unit 1404 but the present invention is not particularly limited to this. For example, a color profile may be created in first printing when the setting for executing the base coating process is made, and may then be stored as a common profile in the storage unit 1404. The storage unit 1404 may store an individual color profile (individual profile) corresponding to each print medium.

Figures 3, 4:
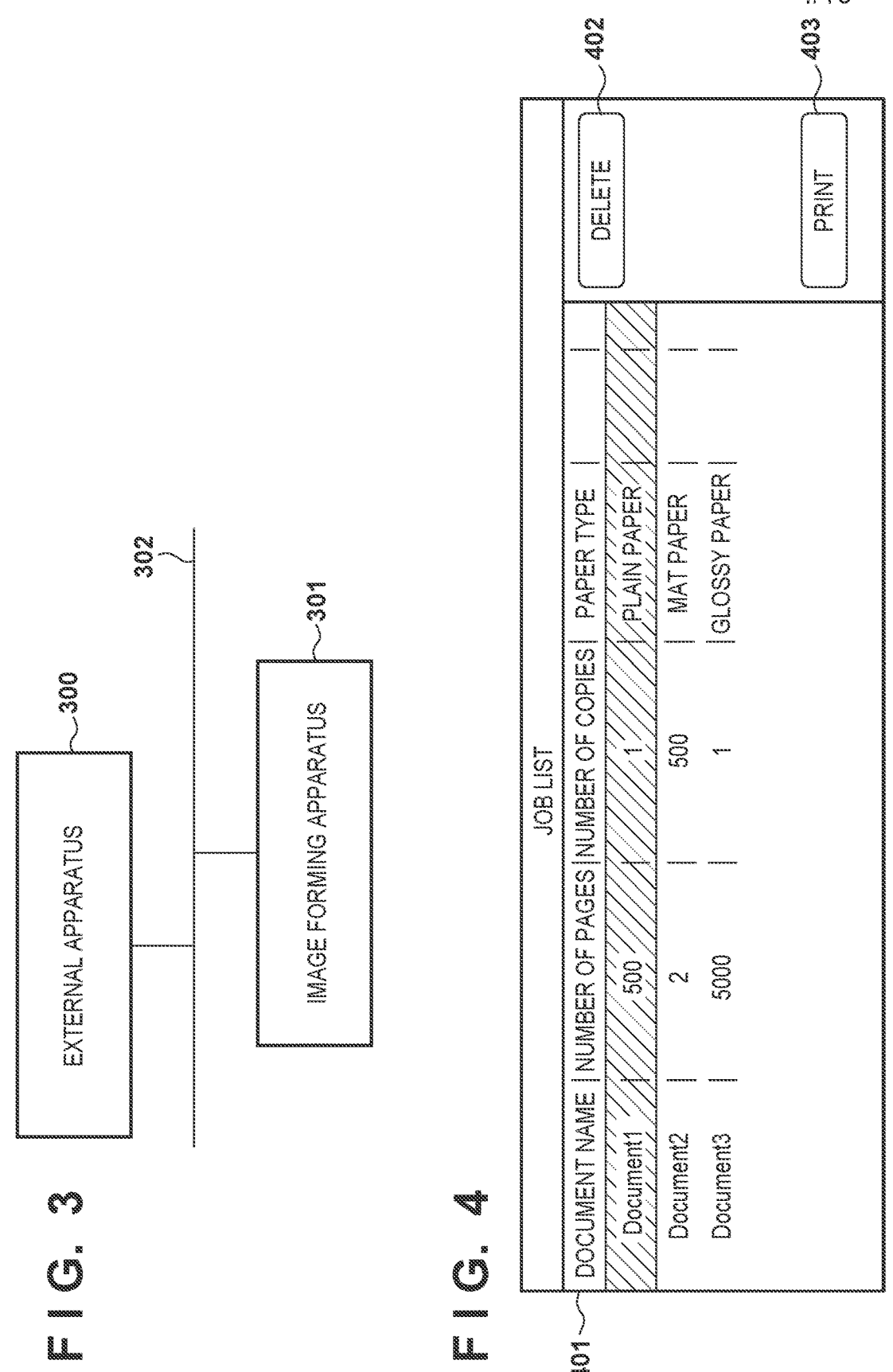
FIG. 3 is a block diagram showing an example of a system configuration according to the first embodiment.
FIG. 4 is a view showing an example of a print setting screen according to the first embodiment.

An operation in a case where the image forming apparatus 100 according to this embodiment executes printing on the print medium will be described next with reference to FIG. 3. FIG. 3 is a block diagram showing an example of a system configuration including the information processing apparatus 102 and the image forming apparatus 100 according to this embodiment. In FIG. 3, an external apparatus 300 is exemplified as the information processing apparatus 102 and an image forming apparatus 301 is exemplified as the image forming apparatus 100.

As shown in FIG. 3, the external apparatus 300 and the image forming apparatus 301 are communicably connected via a communication network 302. Each of the external apparatus 300 and the image forming apparatus 301 is a single apparatus but may be formed by a plurality of apparatuses. The external apparatus 300 creates print data as data to be printed. The external apparatus 300 creates a print job by combining print data, print settings, and a number-of-sheets setting, and transmits the print job to the image forming apparatus 301 via the communication network 302. The control unit 201 of the image forming apparatus 301 receives, via the communication unit 204, data of the print job transmitted from the external apparatus 300.

FIG. 4 is a view showing an example of a print setting screen based on a print job, which is provided by the control unit 201 and the display unit 206. The display unit 206 displays a list of pieces of information of print jobs in a reception order. A display item 401 indicates one of print jobs transmitted to the image forming apparatus 301. The print job information includes various kinds of information concerning printing, such as a document name, the number of pages, the number of copies, and a paper type. In this embodiment, one of the print jobs displayed in the list on the display unit 206 is selected based on a user operation on an operation key of the operation unit 207. A display item 402 is a button used to delete the information of the selected print job from the storage unit 208. A display item 403 is a button used to start printing of the selected print job.

FIG. 5 is a view for explaining the presence/absence of the base coating process and the appearance of a color according to that. When a person sees an object, he/she perceives a color in accordance with the light components (wavelength) of light reflected by the object. If the wavelength of the light reflected by the object is different, the person perceives a different color. In the example of FIG. 5, in a case 501 showing the appearance of the color of print medium A and a case 502 showing the appearance of the color of print medium B, since the materials of print medium A and print medium B are different from each other, the wavelengths of light beams reflected by the print media are different from each other, and thus a person perceives the colors as different colors.

A state 503 is a state in which print medium A has undergone the base coating process, and a state 504 is a state in which print medium B has undergone the base coating process. In the states 503 and 504, the types of the print media are different from each other, but the light components reflected by the object are the same by the base coating process, thereby eliminating the visual influence by the difference between the print media. That is, in the states 503 and 504, the person sees the same color. This applies to a case where color printing is executed on the print medium having undergone the base coating process. By executing the base coating process, it is possible to make the person perceive the same color without being influenced by the difference in surface characteristic between print medium A and print medium B. In other words, by executing the base coating process, the difference in surface characteristic between print medium A and print medium B with respect to the colors is eliminated, and the surface characteristics are unified to the surface characteristic of the base. By executing the base coating process, the color printing printed on the base has the same light reflection characteristic without being influenced by the base.

Normally, with respect to different types of print media, a different color profile is managed and operated for each print medium. However, by executing the base coating process, the same color profile can be operated for different print media. The color profile according to this embodiment can be, for example, an ICC profile but is not limited to this. For example, as the color profile, a color conversion table such as a lookup table that can control the color development characteristic in printing or arbitrary parameters used in a technique of controlling the color development characteristic in printing such as color conversion calculation parameters can be adopted.

A process of setting, as a common profile, a color profile to be used in a case where the setting for executing the base coating process is made will be described next with reference to FIG. 6. FIG. 6 is a flowchart illustrating an example of a process that uses the common profile in a case where the setting for executing the base coating process is made. Each step shown in FIG. 6 is executed by the information processing apparatus 102. Note that the information processing apparatus 102 according to this embodiment is an apparatus separate from the image forming apparatus 100, and controls printing of the image forming apparatus 100. However, the information processing apparatus 102 may be implemented as an apparatus integrated with the image forming apparatus 100.

In step S601, the setting unit 1401 makes print settings. In this example, the setting unit 1401 sets a print medium to be printed and sets whether to execute the base coating process before printing on the print medium. For example, the setting unit 1401 may set, in accordance with a user operation, whether to execute the base coating process, or set, based on information obtained from the image forming apparatus 100 (for example, by obtaining the setting input to the image forming apparatus 100), whether to execute the base coating process. Alternatively, for example, the setting unit 1401 may set, based on the type of the print medium set in the image forming apparatus 100, whether to execute the base coating process. Note that the print medium to be printed may be set based on a user operation in the information processing apparatus 102, an initial setting may be prepared, or the setting of the print medium (for example, information of the print medium set in the image forming apparatus 100) may be obtained from the image forming apparatus 100.

If, for example, the print medium has a color, when printing is executed without concealing the base color of the print medium by the base coating process, the base color of the print medium influences the color of color printing, and printing cannot be executed with the assumed color. In a case where, for example, the print medium is a transparent film, when preventing transparency of a color print portion, it is possible to prevent transparency by executing the base coating process. Therefore, in a case where the type of the print medium is a predetermined type (or color) assumed to undergo the base coating process, the setting unit 1401 can set to execute the base coating process. The type or color of the print medium may be obtained from the information input to the information processing apparatus 102 or from information by the image forming apparatus. Note that in a case where the base color of the print medium is white or a color close to white, or the print medium is a transparent film designed to be transparent, it is assumed not to execute the base coating process. From this viewpoint, in a case where the type of the print medium is a predetermined type (color) assumed not to undergo the base coating process, the setting unit 1401 can set not to execute the base coating process. Note that as described above, the information processing apparatus 102 or the image forming apparatus 100 may set whether to execute the base coating process.

In step S602, the setting unit 1401 determines, based on the settings made in step S601, whether to execute the base coating process. If the base coating process is executed, the process advances to step S603; otherwise, the process advances to step S605. Note that a case where the image forming apparatus 100 determines whether to execute the base coating process will be described later with reference to FIG. 9.

In step S603, the obtaining unit 1402 obtains a common profile, and sets it as a color profile to be used for color matching. In this embodiment, the common profile corresponding to the base coating process is stored in the storage unit 1404, and the obtaining unit 1402 obtains the common profile. Note that in this embodiment, there is one type of common profile. However, there may exist a plurality of base coating processes and a plurality of common profiles respectively corresponding to the base coating processes may be stored.

In step S604, the obtaining unit 1402 creates data (base coating process data) for the base coating process based on the common profile. The base coating process data is print data of the base that is created based on the common profile and printed on, for example, the print medium set in step S601. This base coating process data is data for designating a region where printing is executed using white ink, and this region may be set based on, for example, the size of the print medium or may be set based on a region where color printing is executed after the base coating process. The base coating process data may be created based on the user input. The process of creating the base coating process data will be described later with reference to FIG. 7. After the end of step S604, the process advances to step S608.

In step S605, the setting unit 1401 determines whether there exists an individual profile corresponding to the print medium. The setting unit 1401 according to this embodiment determines whether the corresponding individual profile is stored in the storage unit 1404. If there exists the corresponding individual profile, the process advances to step S607; otherwise, the process advances to step S606.

In step S606, the setting unit 1401 obtains the color profile corresponding to the print medium, and advances the process to step S607. By performing a color matching process using the color profile created for each print medium without executing the base coating process, it is possible to execute printing by taking advantage of the texture or characteristic of the print medium. This corresponding color profile may be obtained from, for example, an external apparatus, or may be obtained as a color profile created by the process of the image forming apparatus 100 to be described later with reference to FIG. 7. In step S607, the setting unit 1401 sets the corresponding individual profile as a color profile to be use for color matching.

In step S608, the output unit 1403 outputs, to the image forming apparatus 100, information of the color profile to be used for color matching, thereby ending the process shown in FIG. 6. At this time, the output unit 1403 simultaneously outputs a print instruction to the image forming apparatus 100. However, a print instruction may be output separately from step S608. If the base coating process data is created in step S604, the base coating process data is also output. In this embodiment, the output unit 1403 can transmit color print data simultaneously with the base coating process data. In this example, the color print data is transmitted to the image forming apparatus 100 simultaneously with the base coating process data. However, the color print data may be transmitted before step S601, or may be transmitted from an apparatus different from the information processing apparatus 102 to the image forming apparatus 100.

Note that the information processing apparatus 102 creates the base coating process data and transmits it to the image forming apparatus 100. However, the image forming apparatus 100 may create base coating process data based on the common profile. In this case, the method of creating base coating process data can be the same as that by the information processing apparatus 102.

Figure 15:
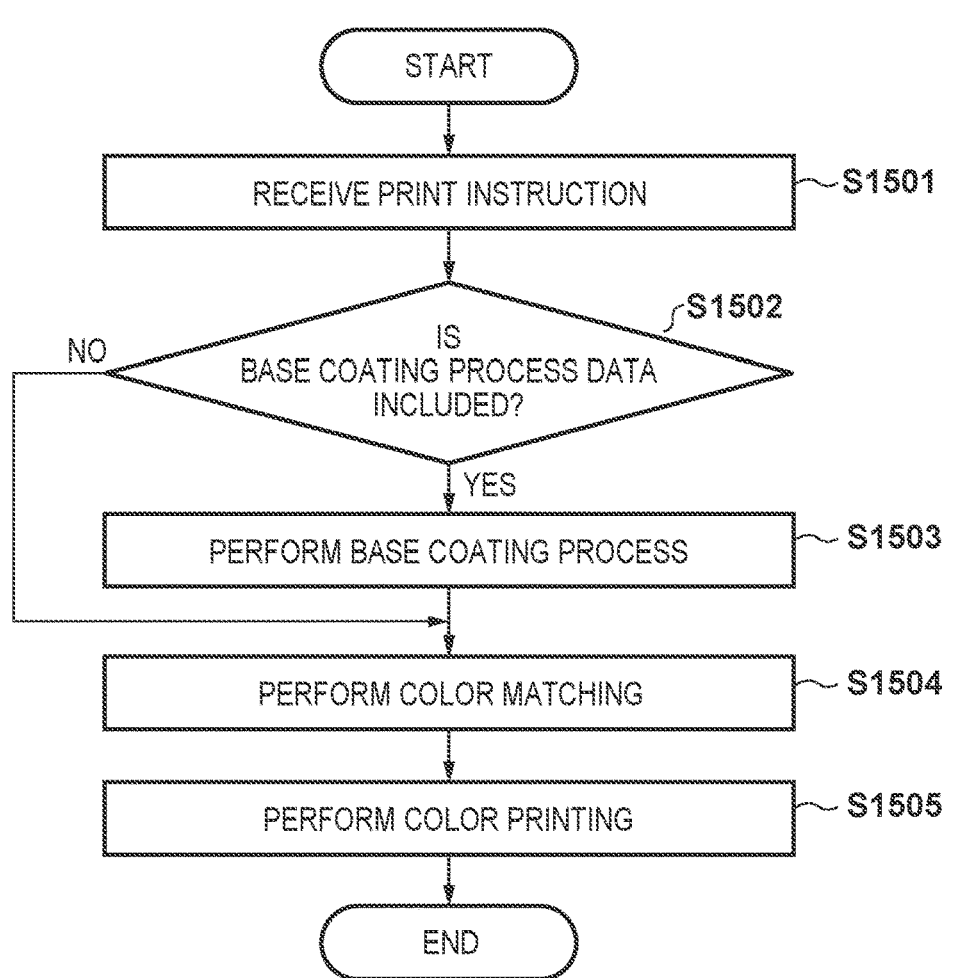
FIG. 15 is a flowchart illustrating an example of a process executed by a printing apparatus according to the first embodiment.

The process executed by the image forming apparatus 100 that has received the color profile and the print instruction will be described next with reference to FIG. 15. FIG. 15 is a flowchart illustrating an example of the print process executed by the image forming apparatus 100 that has received the print instruction including the color profile. The steps shown in FIG. 15 are executed by the control unit 201 of the image forming apparatus 100. Note that the process shown in FIG. 15 is executed by the image forming apparatus 100 as an apparatus different from the information processing apparatus 102, as described above. However, the information processing apparatus 102 may be implemented in the image forming apparatus 100. If the information processing apparatus 102 is implemented in the image forming apparatus 100, step S1503 is executed following step S604, and steps S1504 and S1505 are executed following step S1503 or S607. A description of the process of conveying the print medium when executing printing will be omitted.

In step S1501, the control unit 201 receives the print instruction from the information processing apparatus 102. In this embodiment, the print instruction includes the color profile to be used for color matching. In the example shown in FIG. 15, assume that the print instruction also includes color print data.

In step S1502, the control unit 201 determines whether the received print instruction includes the base coating process data. If the print instruction includes the base coating process data, the process advances to step S1503; otherwise, the process advances to step S1504.

In step S1503, the control unit 201 controls the white printhead to perform the base coating process, and advances the process to step S1504. In step S1504, the control unit 201 performs color matching using the color profile obtained in step S1501. In step S1505, the control unit 201 executes color printing based on the color print data obtained in step S1501, thereby ending the process.

Note that in this example, the print instruction is received in step S1501. However, if the image forming apparatus 100 receives the common profile, it is unnecessary to receive other information. For example, only the common profile may be received in step S1501, and may be set as a color profile to be used for color matching after the base coating process executed by the image forming apparatus 100 at another predetermined timing.

Figure 7:
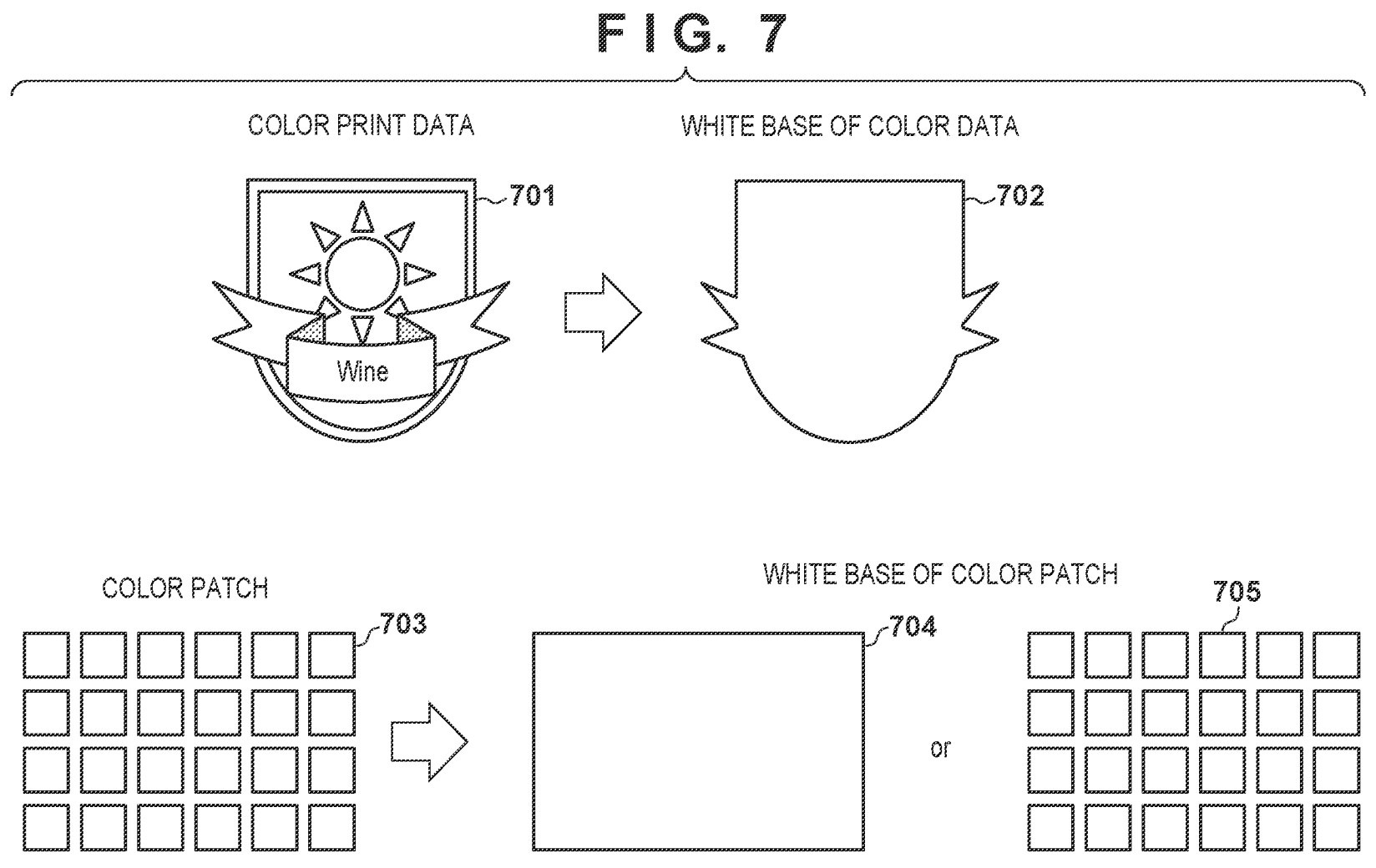

The method of generating the base coating process data by the obtaining unit 1402 will be described with reference to FIG. 7. In the example shown in FIG. 7, color print data 701 is printed on a base 702. The color print data 701 is a label image to be printed. For example, the obtaining unit 1402 can create base coating process data by assuming that printing by white ink is executed in a region having the same size and shape as those of the print region of the color print data. Furthermore, for example, the obtaining unit 1402 may obtain base coating process data created by the user using an application (for example, the same application as the application that has created the color print data) or the like.

Furthermore, a case where a color patch 703 for performing colorimetry by a colorimeter is printed to execute creation of a color profile or calibration will be described. The image forming apparatus 100 according to this embodiment can print the color patch on the print medium having undergone the base coating process, and create a common profile corresponding to the base coating process based on the color patch. When printing the color patch 703, the image forming apparatus 100 may perform the base coating process using a base region 704 including the print region of the color patch or using a base region 705 corresponding to the color patch 703, as shown in, for example, FIG. 7. Note that the individual profile can be created based on the color patch that is printed on the print medium not having undergone the base coating process.

FIG. 8 shows an example of printing using the base coating process and the common profile. In the example shown in FIG. 8, the base coating process is performed only for a partial region within a print range. If a design that uses the base color of the print medium is printed, no base coating process is executed for a region (a crosshatched portion in FIG. 8) where the base color is used, and the base coating process is performed using white ink only for a portion where the influence of the base color is desirably eliminated, thereby executing color printing on the region having undergone the base coating process. In this way, the portion having undergone the base coating process has a color subjected to color matching, and the crosshatched portion not having undergone the base coating process has a color influenced by the base color of the print medium. For example, in a case where printing is executed using a print medium whose base color is silver, if color printing is executed for silver as the base color without executing the base coating process, ink used is influenced by the print medium, and thus color printing of metallic color development is executed. In this way, even if color printing is executed using the color profile common to the media, the color development characteristic of color printing can be made different between a case where the base coating process is executed and a case where the base coating process is not executed.

Figure 9:
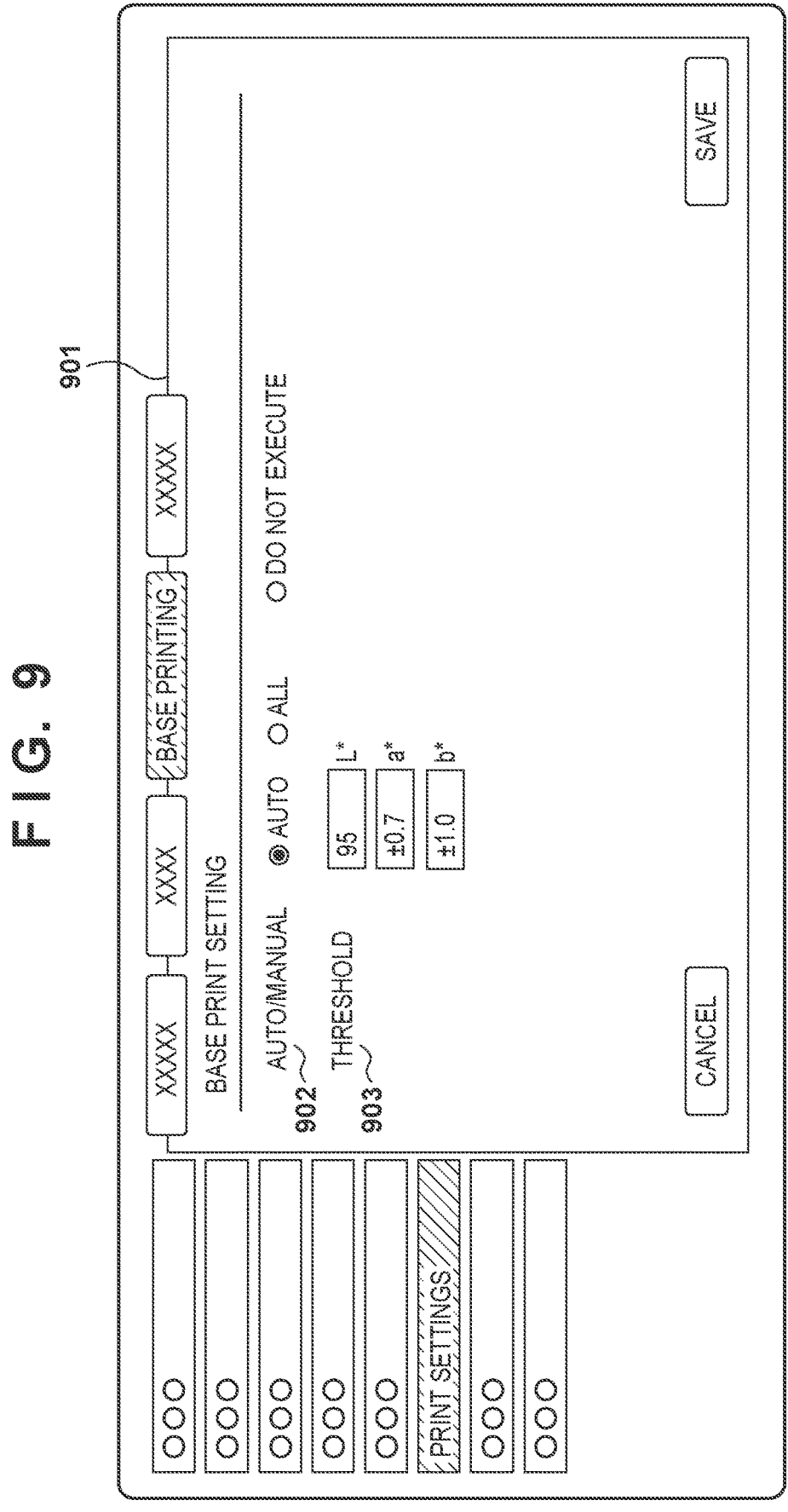
FIG. 9 is a view showing an example of setting of determination of whether to execute the base coating process according to the first embodiment.

An example in which the process of determining whether to execute the base coating process is performed by the image forming apparatus 100 will be described. FIG. 9 is a view showing an example of a user interface (UI) displayed when the process, described in step S602, of determining whether to execute the base coating process is performed by the image forming apparatus 100. A UI 901 is a UI for making a setting concerning the determination process. An auto/manual setting item 902 is an item for making a setting of whether to automatically execute the determination process (for example, in accordance with the color of the print medium). In the example shown in FIG. 9, three items of "auto", "all", and "non-execution" are prepared in the setting item 902. If "auto" is selected, the determination process is automatically executed. If "all" is selected, the base coating process is executed for all the print media, and if "non-execution" is selected, color printing is directly executed without performing the base coating process for all the print media.

If the determination process is automatically performed, whether to execute the base coating process is determine based on conditions set by a threshold setting item 903. In this embodiment, this determination process is performed based on the L*a*b* values of the print medium. These values are designated in the item 903 and the designated values are used as thresholds to be used in the following description. For example, if all conditions of L* value of print medium>threshold of L* value, a* value of print medium<threshold of a* value, and b* value of print medium<threshold of b* value are satisfied, or one or two of the conditions are satisfied, a setting can be made not to execute the base coating process. Note that in this embodiment, the L*a*b* values are used as thresholds but the thresholds are not limited to them, and a different value such as XYZ values or a density value may be used.

FIG. 10 is a table for explaining the relationship between the base coating process and the color profile according to this embodiment. Print medium A, print medium B, and print medium C indicate different types of print media, and do not indicate specific print media. Furthermore, FIG. 10 exemplifies three types of print media but the number of types of print media is not particularly limited to this. Each medium and a color profile to be used will be described below. The color of each print medium is a colorimetry result obtained by performing colorimetry by the image forming apparatus 100. For example, the setting unit 1401 can decide the setting of whether to execute the base coating process, based on the colorimetry result of the print medium shown in FIG. 10, which is obtained by performing colorimetry by the image forming apparatus 100.

Print medium A is a print medium whose base color is gold, silver, or another relatively dark color (a color preset as a relatively dark color). With respect to color medium A, when executing color printing without performing the base coating process, the base color of the print medium influences the colorimetry result, and it is difficult to create an appropriate color profile. Therefore, in this embodiment, to execute color printing with an appropriate color based on the fact that the print medium has such color, printing is performed by executing a color matching process using the common profile after executing the base coating process. If color development of printing is desirably influenced by the base color of the print medium in design, for example, if metallic color development based on the base color of the print medium is desirably performed, it may be determined not to execute the base coating process and color printing may directly be executed.

Print medium B is a print medium whose base color is not white but a light color (a color preset as a light color) close to white. If, for example, brightness is smaller than 10 and equal to or larger than a predetermined threshold, a light color close to white can be determined. When print medium B is used, even if the base coating process is not executed, the base color of the print medium hardly influences color printing, and it is possible to create an individual profile. Therefore, when executing printing on print medium B, the color matching process can be performed using the common profile in a case where the base coating process is executed and using the individual profile in a case where the base coating process is not executed.

Print medium C is a print medium whose base color is white. When print medium C is used, the base color of the print medium hardly influences color printing, and it is possible to create an individual profile without any problem. Therefore, when executing printing on print medium C, the color matching process can be performed using the common profile in a case where the base coating process is executed and using the individual profile in a case where the base coating process is not executed.

Note that this embodiment has described the example in which ink is fixed on the print medium by fixing ink. However, a print material different from fixing ink, such as toner, may be used in accordance with the type of the print medium.

Second Embodiment

The information processing apparatus 102 according to the first embodiment outputs the common profile in a case where the setting for executing the base coating process is made. An information processing apparatus 102 according to this embodiment outputs a common profile regardless of whether the setting for executing the base coating process is made. In this case, an image forming apparatus 100 executes the base coating process for all print media without performing the process of determining whether to execute the base coating process. By executing the base coating process in all cases, only the common profile is used as a color profile used for color matching. As a result, it is possible to largely reduce the load of management and operation of profiles and profile creation by the user. The arrangements and operations of the information processing apparatus and the image forming apparatus are the same as in the first embodiment.

FIG. 11 is a flowchart illustrating an example of a process using the common profile, that is executed by the information processing apparatus 102 according to this embodiment. The process shown in FIG. 11 is the same as that shown in FIG. 6 of the first embodiment except that the process advances to step S603 after step S601 without executing step S602 (as a result, steps S605 to S607 are not executed), and a repetitive description thereof will be omitted.

Note that in FIG. 11, an example of a process when the image forming apparatus 100 executes the base coating process for all printing operations and executes color printing on it is explained. However, the process may be performed by assuming that the base coating process is not executed (by omitting step S604). In this case, upon receiving a print instruction, the image forming apparatus 100 executes a color matching process using the common profile without executing the base coating process, and executes color printing on the print medium. In this case, since color development of color printing is influenced by the surface characteristic of the print medium, the effect of color matching is reduced. However, the form in which only the common profile is created and managed can cope with a case where the base coating process is not executed as design, for example, a case of printing on a transparent film.

Third Embodiment

The information processing apparatus 102 according to the second embodiment outputs the common profile in all cases (regardless of whether the setting for executing the base coating process is made). An information processing apparatus 102 according to this embodiment outputs a common profile in all cases, similar to the second embodiment, but does not instruct to execute the base coating process in a case where the color of ink printed in the base coating process matches or is close to the color of a print medium.

FIG. 12 is a flowchart illustrating an example of a process using the common profile, that is executed by the information processing apparatus 102 according to this embodiment. The process shown in FIG. 12 is the same as that shown in FIG. 11 of the second embodiment except that steps S1201 and S1202 are executed following step S603, and a repetitive description thereof will be omitted.

In step S1201, an obtaining unit 1402 obtains information representing the color of a print medium to be used for printing. The obtaining unit 1402 may obtain the information representing the color of the print medium based on, for example, the setting of the print medium set in step S601, or may obtain the information from an image forming apparatus 100. The image forming apparatus 100 can measure (in, for example, L*a*b* values) the color of the print medium by, for example, a known colorimetric process using a colorimeter 111, and transmit the data to the information processing apparatus 102.

In step S1202, the obtaining unit 1402 compares the color of ink to be used for the base coating process corresponding to the common profile obtained in step S603 with the color of the print medium obtained in step S1201, and determines whether these colors are close to each other. If it is determined that the colors are close to each other, the process advances to step S608; otherwise, the process advances to step S604. That is, if it is determined that the colors are close to each other, step S604 as a process of creating base coating process data is omitted, and a print instruction to be transmitted in step S608 does not include an instruction of the base coating process. In this example, if, for example, a color difference ΔE (in the L*a*b* space in this example) between the color of the ink and the color of the print medium is smaller than a predetermined threshold (for example, 0.5), the obtaining unit 1402 can determine that the colors are close to each other. Note that the process of determining whether the colors are close to each other is not limited to the process using the color difference. For example, the determination process may be performed by comparing the spectral characteristics using spectral colorimetric values obtained by the colorimeter 111. As described above, if the light reflection characteristics of the color of the ink (white of white ink) to be printed by the base coating process and the color of the print medium (white as the base color of the print medium) match each other with respect to all light wavelengths or the characteristics are close to each other, it is possible to omit the base coating process.

Note that if the image forming apparatus 100 executes the processes in steps S1201 and S1202, colorimetric data may be stored in a storage unit 208 to eliminate the labor of printing ink printed by the base coating process and performing colorimetry every time.

Fourth Embodiment

Consider a case where even if the base coating process is executed, the influence of the color of a print medium on color development of printing is not completely suppressed. This may occur when, for example, the surface color of the print medium has high color development or is a fluorescent color or the base coating process cannot be executed with a sufficient amount of ink due to the print speed, the drying temperature, the surface characteristic of a base material, or the like. Even if the setting for executing the base coating process is made, if it is determined that the influence of the color of the print medium is not sufficiently suppressed by the base coating process, an information processing apparatus according to the fourth embodiment instructs to perform color matching using not a common profile but an individual profile.

FIG. 13 is a flowchart illustrating an example of a process using the common profile, that is executed by an information processing apparatus 102 according to this embodiment. The process shown in FIG. 13 is the same as that shown in FIG. 6 of the first embodiment except that steps S1301 to S1303 to be executed when it is determined in step S602 to execute the base coating process are included, and a repetitive description thereof will be omitted.

If it is determined in step S602 to execute the base coating process, a setting unit 1401 determines, in step S1301, whether the influence of the color of a print medium on color development of printing is sufficiently suppressed by the base coating process. If it is determined that the influence is sufficiently suppressed, the process advances to step S603; otherwise, the process advances to step S1302. In step S1302, the setting unit 1401 obtains a color profile corresponding to the print medium, and advances the process to step S1303. In step S1303, the setting unit 1401 sets the corresponding individual profile as a color profile to be used for color matching, and advances the process to step S604. Steps S1302 and S1303 are the same as steps S606 and S607 of FIG. 6 except that the process advances to step S604 thereafter, and a repetitive description thereof will be omitted.

An obtaining unit 1402 according to this embodiment can obtain evaluation of the influence of the color of the print medium on color development of printing by the base coating process. The evaluation of the influence of the color of the print medium on color development of printing by the base coating process may be calculated as, for example, the concealing rate of the color of the print medium by the base coating process. In this example, for example, the concealing rate of the color of the print medium by the base coating process may be calculated based on the colorimetry result of an image forming apparatus 100, and the above-described determination process in step S1301 may be performed based on the calculated concealing rate.

An example in which the image forming apparatus 100 calculates the concealing rate of the color of the print medium by the base coating process will be described below. This process can be executed in the same manner regardless of whether the process is a process in a case where the information processing apparatus 102 is included in the image forming apparatus 100 or a process in a case where the image forming apparatus 100 transmits the calculated concealing rate to the information processing apparatus 102.

For example, the color difference between a color (the color of ink in base printing) in a state of a concealing rate of 100% in which there is no influence of the base color of the print medium on color development and a color in printing in a case where base printing is executed on the print medium may be calculated as a concealing rate. In this case, when the calculated color difference is smaller than a predetermined threshold, it is considered that the concealing rate is sufficient, and it is determined in step S1301 that the influence on color development is sufficiently suppressed. At this time, a color difference $\Delta E$ can be calculated using a known formula such as a color difference formula $\Delta E76$ or $\Delta E2000$ but may be calculated by another arbitrary method. The threshold used to determine the concealing rate is not particularly limited, and can be arbitrarily set in accordance with a desired condition. Because of the influence of the surface characteristic of the print medium on the surface through white base printing, it is easy to imagine that the threshold of the color difference is a small value. Note that the color in the state of a concealing rate of 100% can be measured in advance, and stored in the storage unit 208 or 1404.

Note that evaluation of the influence on color development of printing by the base coating process may be performed based on, for example, the color of the print medium obtained in step S601. For example, decision may be performed in accordance with the color of the print medium obtained in step S601. For example, in the case of a predetermined color whose influence on color development is estimated not to be sufficiently suppressed, the process following step S1301 may be step S1302.

Fifth Embodiment

In each of the above-described embodiments, for example, each processing unit shown in FIG. 14 and the like is implemented by a dedicated hardware component. Some or all of the processing units of the information processing apparatus 102 may be implemented by a computer. In this embodiment, at least part of the process according to each of the above-described embodiments is executed by a computer.

FIG. 16 is a block diagram showing the basic arrangement of the computer. In FIG. 16, a processor 1601 is, for example, a CPU, and controls the operation of the overall computer. A memory 1602 is, for example, a RAM, and temporarily stores programs, data, and the like. A computer-readable storage medium 1603 is, for example, a hard disk, a CD-ROM, or the like, and stores programs, data, and the like in a long term. In this embodiment, a program for implementing the function of each unit, that is stored in the storage medium 1603, is read out into the memory 1602. Then, the processor 1601 operates in accordance with the program in the memory 1602, thereby implementing the function of each unit.

In FIG. 16, an input interface 1604 is an interface for obtaining information from an external apparatus. An output interface 1605 is an interface of outputting information to an external apparatus. A bus 1606 connects the above-described units to allow exchange of data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-064389, filed Apr. 11, 2023, which is hereby incorporated by reference herein in its entirety.

What is claimed is:

1. An information processing apparatus comprising:
a first obtaining unit configured to obtain, in a case where a setting for executing a base coating process for a print medium before printing on the print medium is made, a first color profile independent of a type of a print medium, and obtain, in a case where the setting for executing the base coating process is not made, a second color profile corresponding to a type of the print medium; and
an output unit configured to output the first color profile for the print medium having undergone the base coating process, and output the second color profile for the print medium not having undergone the base coating process.

2. The apparatus according to claim 1, further comprising a setting unit configured to set whether to execute the base coating process before printing on the print medium,
wherein in a case where the setting unit sets to execute the base coating process before printing on the print medium, the first obtaining unit obtains the first color profile.

3. The apparatus according to claim 2, wherein the setting unit sets, in accordance with a user operation, whether to execute the base coating process.

4. The apparatus according to claim 2, wherein the setting unit sets, based on the print medium to be used for printing, whether to execute the base coating process.

5. The apparatus according to claim 2, wherein the setting unit sets, based on a colorimetry result of the print medium by an image forming apparatus that executes the base coating process, whether to execute the base coating process.

6. The apparatus according to claim 1, wherein the base coating process is a process of printing white ink on the print medium.

7. The apparatus according to claim 1, wherein the first color profile is a color profile created based on a color patch printed on the print medium having undergone the base coating process.

8. The apparatus according to claim 1, wherein the second color profile is a color profile created based on a color patch printed on the print medium not having undergone the base coating process.

9. The apparatus according to claim 1, further comprising:
a second obtaining unit configured to obtain evaluation of an influence of a color of the print medium on color development of printing by the base coating process; and
a determination unit configured to determine, based on the evaluation of the influence, whether the influence of the color of the print medium on the color development of the printing is sufficiently suppressed by the base coating process,
wherein in a case where the setting for executing the base coating process is made and it is determined that the influence is sufficiently suppressed, the first obtaining unit obtains the first color profile,
in a case where the setting for executing the base coating process is made and it is determined that the influence is not sufficiently suppressed, the first obtaining unit obtains the second color profile corresponding to the type of the print medium, and
the output unit outputs the color profile obtained by the first obtaining unit for the print medium having undergone the base coating process.

10. An information processing method comprising:
obtaining, in a case where a setting for executing a base coating process for a print medium before printing on the print medium is made, a first color profile independent of a type of a print medium, and obtaining, in a case where the setting for executing the base coating process is not made, a second color profile corresponding a type of the print medium; and
outputting the first color profile for the print medium having undergone the base coating process, and outputting the second color profile for the print medium not having undergone the base coating process.

11. A non-transitory computer readable storage medium on which is stored a computer program for making a computer execute an information processing method comprising:
obtaining, in a case where a setting for executing a base coating process for a print medium before printing on the print medium is made, a first color profile independent of a type of a print medium, and obtaining, in a case where the setting for executing the base coating process is not made, a second color profile corresponding to a type of the print medium; and
outputting the first color profile for the print medium having undergone the base coating process, and outputting the second color profile for the print medium not having undergone the base coating process.

* * * * *